US005703677A

United States Patent [19]
Simoncelli et al.

[11] Patent Number: 5,703,677
[45] Date of Patent: Dec. 30, 1997

[54] SINGLE LENS RANGE IMAGING METHOD AND APPARATUS

[75] Inventors: Eero Simoncelli; Hany Farid, both of Philadelphia, Pa.

[73] Assignee: The Trustees of the University of Pennsylvania, Philadelphia, Pa.

[21] Appl. No.: 557,527

[22] Filed: Nov. 14, 1995

[51] Int. Cl.$^6$ ........................................ G01C 3/08
[52] U.S. Cl. ................ 356/4.04; 250/201.7; 356/4.06; 382/106; 396/89; 364/458
[58] Field of Search ................ 356/4.04, 4.06, 356/4.01; 382/106; 250/201.7; 396/89; 364/458

[56] References Cited

U.S. PATENT DOCUMENTS

| | | |
|---|---|---|
| 3,732,001 | 5/1973 | Harrison . |
| 3,836,254 | 9/1974 | Barringer . |
| 3,953,863 | 4/1976 | Lang ........................ 354/25 |
| 4,427,880 | 1/1984 | Kanade et al. ............... 250/222.1 |
| 4,584,704 | 4/1986 | Ferren ........................ 382/65 |
| 4,645,347 | 2/1987 | Rioux ........................ 356/376 |
| 4,661,986 | 4/1987 | Adelson ...................... 382/41 |
| 4,687,914 | 8/1987 | Tsunekawa et al. .......... 250/201.4 |
| 4,687,917 | 8/1987 | Tsunekawa et al. .......... 250/201 |
| 4,690,549 | 9/1987 | Nakada ....................... 356/4 |
| 4,695,156 | 9/1987 | Taft .......................... 356/1 |
| 4,734,571 | 3/1988 | Hamada et al. ............... 250/201 |
| 4,798,469 | 1/1989 | Burke ........................ 356/376 |
| 4,891,829 | 1/1990 | Deckman et al. .............. 378/4 |
| 4,965,442 | 10/1990 | Girod et al. ................. 250/201.7 |
| 4,965,840 | 10/1990 | Subbarao ..................... 382/1 |
| 5,003,166 | 3/1991 | Girod ........................ 250/201.4 |
| 5,076,687 | 12/1991 | Adelson ...................... 356/4 |
| 5,193,127 | 3/1993 | Subbarao ..................... 382/41 |
| 5,227,890 | 7/1993 | Dowski, Jr. .................. 357/227 |
| 5,233,174 | 8/1993 | Zmek ......................... 250/201.9 |
| 5,243,375 | 9/1993 | Ishida et al. ................ 354/402 |

OTHER PUBLICATIONS

Adelson and Wang "Single Lens Stereo With A Planoptic Camera," IEEE Transactions on Pattern Analysis and Machine Intelligence, 14(2) (Feb./1992), pp. 99–106.

Dowski and Cathey "Single-Lens Single-Image Incoherent Passive-Ranging Systems," Applied Optics 33(29) (Oct./1994), pp. 6762–6773.

Jones and Lamb "Analyzing the Visual Echo: Passove 3-D Imaging With A Multiple Aperture Camera," Technical Report CIM-93-3 (Feb./11/1993) pp. 1–23.

Nayer et al. "Real-Time Focus Range Sensor," Department of Computer Science, Columbia University CUCS-028-94 (Nov./1994) pp. 1–29.

*Primary Examiner*—Stephen C. Buczinski
*Attorney, Agent, or Firm*—Woodcock Washburn Kurtz Mackiewicz & Norris LLP

[57] ABSTRACT

A single lens range sensor comprises a camera 27 having a pair of plano-convex lenses 28a and 28b, an optical mask 30, an imaging sensor 32, a digitizer 34 and a computer 36. The optical mask 30 may be implemented with a liquid crystal array having spatially varying opacity which can be switched (e.g., by the computer 36) between masks derived from a differentiable mask function and its derivative. Alternatively, the mask 30 may be composed of two printed masks which are mechanically switched to obtain two images based on the differentiable mask function and its derivative. The imaging sensor 32 may be implemented with a CCD array. The invention avoids the correspondence problems of the two camera and moving camera approaches, and is simple to calibrate.

10 Claims, 5 Drawing Sheets

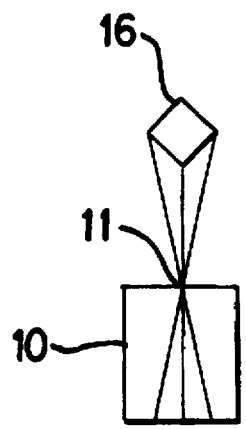
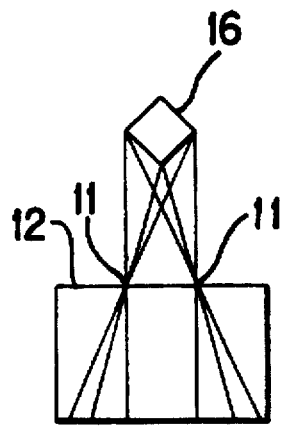
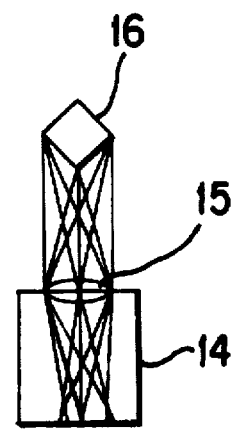
FIG. 1(a)   FIG. 1(b)   FIG. 1(c)
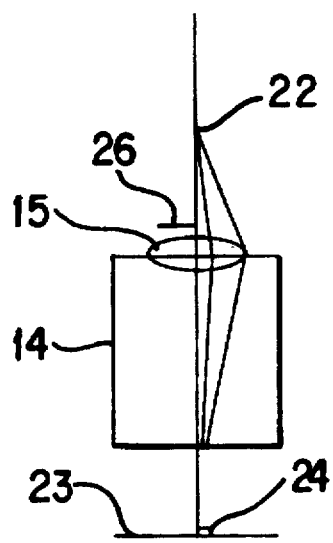
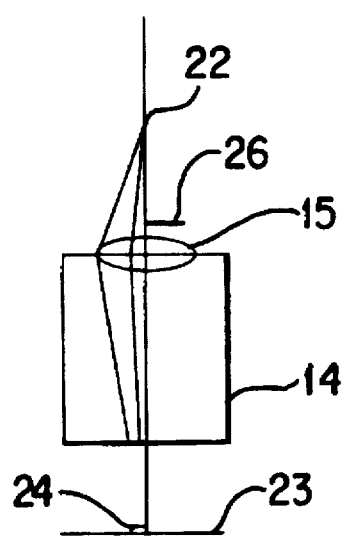
FIG. 3(a)   FIG. 3(b)

SINGLE LENS RANGE IMAGING METHOD AND APPARATUS

FIELD OF THE INVENTION

The present invention relates generally to range sensors, and more particularly to a single lens range imaging method and apparatus.

BACKGROUND OF THE INVENTION

An image can be formed by placing an idealized pinhole camera 10, having a pinhole or small aperture 11, in front of an object 16, as shown in FIG. 1(a). The object 16 is assumed to project light in all directions, but the image formed by the pinhole camera 10 is composed of light from just a fraction of these directions, as represented by the three rays projected from three vertices of the object through the aperture 11. The image obtained in this manner contains no information about the three-dimensional structure of the object.

FIG. 1(b) depicts a binocular stereo camera 12 in which a pair of pinholes 11 in front of the object 16 capture two slightly different images of the object. From the pair of images, the three-dimensional structure of the object can be determined using triangulation. Alternatively, a sequence of images can be obtained by moving a single pinhole camera 10 (FIG. 1(b)) in front of the object 16, and the three-dimensional structure of the object can be recovered from the motion parallax.

FIG. 1(c) depicts a lens camera 14 having a lens 15 that collects light from a continuum of viewpoints and integrates this light into an image. However, the image created by a single lens camera 14, like that created by a pinhole camera 10, lacks information about the three-dimensional structure of the object 16.

The computer vision community has long relied on binocular stereo (for a review, see U. Dhond and J. Aggarwal, "Structure from Stereo—a Review," IEEE Transactions on Systems, Man and Cybernetics, 19(6):1489–1510, 1989) to recover the three-dimensional structure of an arbitrary scene. (The three-dimensional structure of a scene is often referred to as depth, range, shape, or 3D-form. In this specification, the term range is employed to refer to the three-dimensional structure of a scene.) Although successful under certain conditions, this method suffers from several problems. Binocular stereo systems require two or more cameras, increasing the physical size and cost of the system. Moreover, the determination of range requires matching between the stereo image pair, which is computationally demanding and is frequently complicated by occlusions, false matches, lighting variations, and calibration errors. Such problems inherent to matching are generally referred to as correspondence problems.

Range information is necessary in a countless variety of applications, including robot navigation and manipulation, manufacturing, automated inspection, object recognition, medical imaging, and even the creation of special effects in the film and television industries.

SUMMARY OF THE INVENTION

The present invention provides a simple, fast, single lens range sensor which overcomes many of the problems inherent to prior art range sensors. The invention utilizes two optical masks (optical filters with varying opacity across their surfaces) in combination with a single lens and a computer system to derive range information. The masks are based on (i.e., simple linear combinations of) a differentiable function and the derivative of that function. Preferably, the two masks are rotated copies of each other. One simple example is the opaque half-lens masks described below. Another simple example is a mask that is entirely opaque except for an off-center hole through which light is transmitted. A preferred mask is characterized by a mask function that is a weighted sum of a differentiable function and its derivative.

In presently preferred embodiments of the invention, the mask is positioned in front of a lens, and the system is employed to obtain range information of the kind traditionally obtained with a binocular system of cameras or a single moving camera. The present invention avoids the correspondence problems of the two camera and moving camera approaches, and is also simpler to calibrate.

In one presently preferred embodiment, the range of each point or patch in an image is determined by a simple combination of a spatial derivative and an aperture derivative. The former can be determined using any of a number of standard digital derivative filters. The latter can be computed by acquiring a pair of images with one of two aperture masks in front of the main lens: (1) a two-dimensional Gaussian, and (2) a partial, spatial derivative of the Gaussian. The range at each point or patch in the image may be computed as a simple combination of the two filtered images.

Other features and advantages of the present invention are described below.

BRIEF DESCRIPTION OF THE DRAWINGS

FIGS. 1(a) through 1(c) illustrate image formation by a pinhole camera, a two-pinhole camera forming a binocular stereo pair, and a lens collecting light from a continuum of viewpoints, respectively.

FIGS. 2(a)–2(c) are top views of the system with the object in the focal plane, in front of the focal plane, and behind the focal plane, respectively. FIGS. 2(d)–2(f) are views similar to FIGS. 2(a)–2(c) but with an opaque mask blocking light from entering one-half of the lens.

FIGS. 3(a) and 3(b) depict a discrete version of a single lens range sensor in accordance with the present invention.

DETAILED DESCRIPTION OF PREFERRED EMBODIMENTS

By exploiting the properties of thin-lens image formation, the present invention provides a single lens range sensor which overcomes many of the problems encountered by traditional systems. The invention may be used to determine range from a simple combination of a pair of images acquired by placing one of two aperture masks in front of a main camera lens. This approach allows for the generation of fast (e.g., 15 frames/second), reliable and accurate range maps.

The present invention will now be explained in terms of what it does, how it works, and how it can be physically implemented. As mentioned above, a camera lens collects light from a continuum of viewpoints, as depicted in FIG. 1(c). The resultant intensity image is formed by averaging the amount of light striking the lens from the different viewing directions. In large part, the prior art overlooks this fact and in so doing ignores a rich source of information. The present invention makes use of this information and is able to avoid many of the problems encountered by more traditional approaches.

Figure 2A:
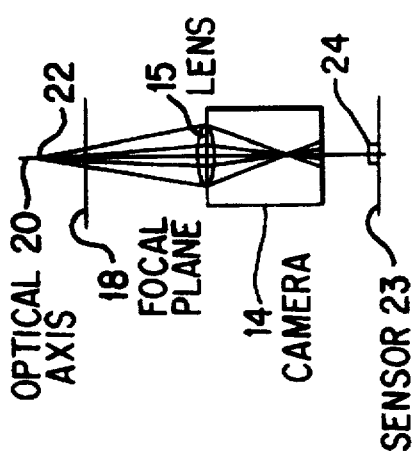
FIGS. 2(a) through 2(f) illustrate a thin lens image formation system. In particular.
Figure 2B:
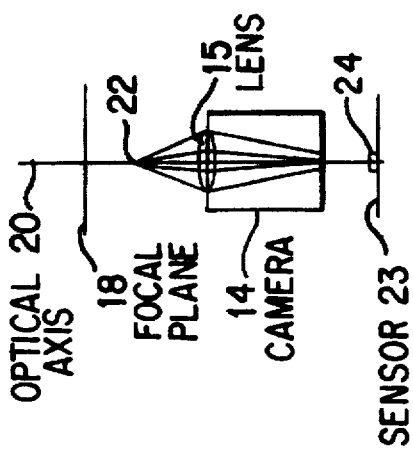
Figure 2C:
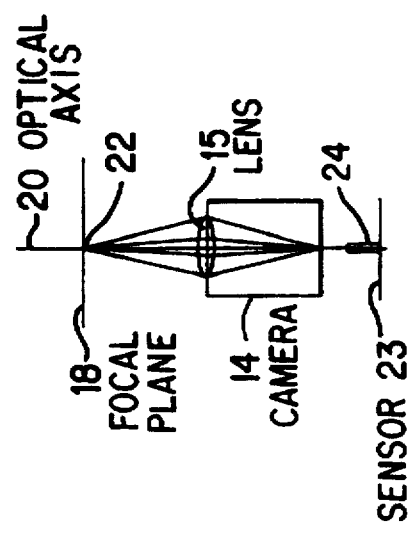
Figure 2D:
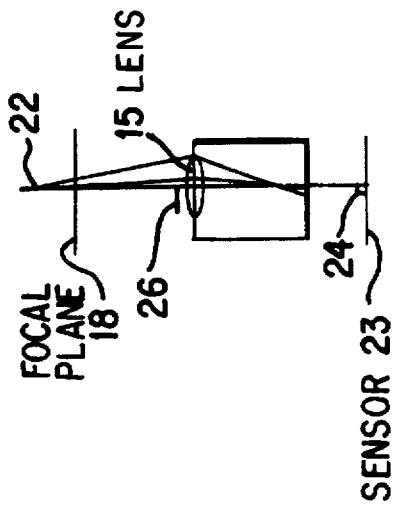
Figure 2E:
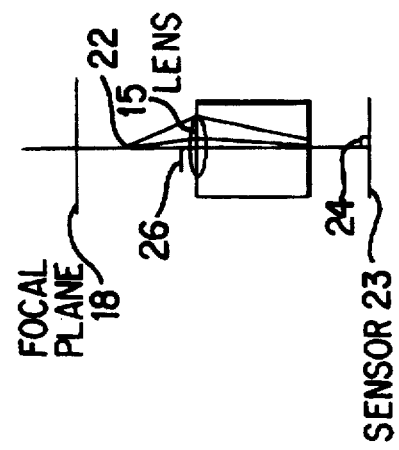
Figure 2F:
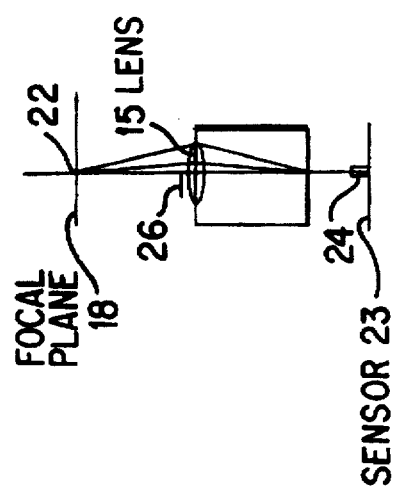
Figure 3C:
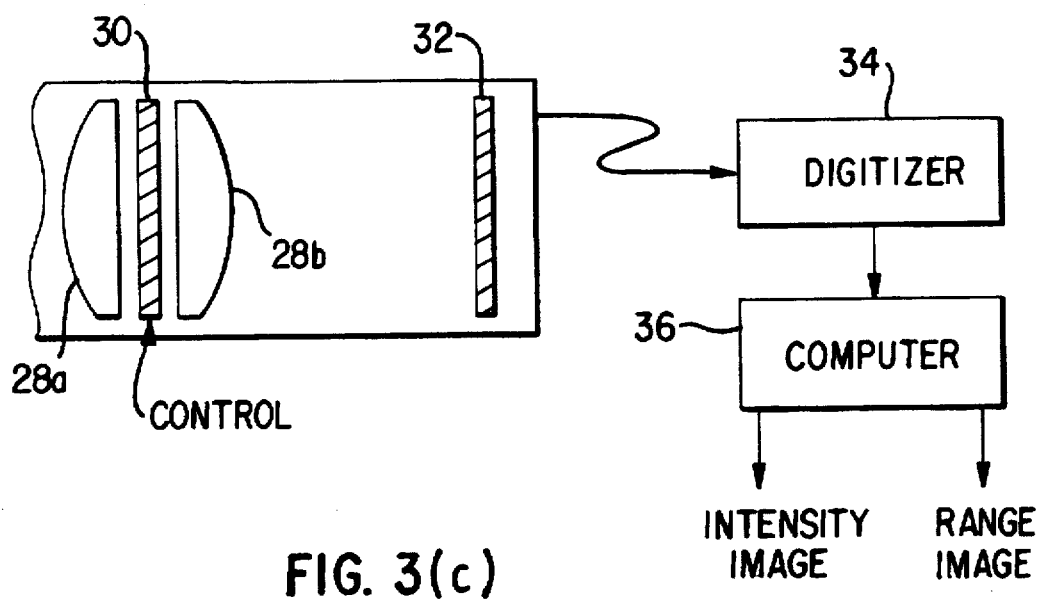
FIG. 3(c) schematically depicts a single lens range sensor employing an optical mask in accordance with the present invention.

Unlike the pinhole camera, with an infinite depth of field, objects imaged through a lens appear differently depending on their range. Objects lying outside the focal plane will be blurred as a simple function of their distance from the focal plane, as shown in FIGS. 2(a) through 2(c). In these figures, reference numerals 18, 20, 22, 23 and 24 denote a focal plane, optical axis, point source of light, sensor plane, and a plot of image intensity as a function of position in the sensor plane, respectively (note that the imaging sensor itself is not shown in these illustrations, but is shown in FIG. 3(c)). In the one-dimensional plot 24 beneath each camera 14 depicted in FIGS. 2(a)–2(c), the height of the response is proportional to the intensity of the imaged point. FIGS. 2(a)–2(c) depict configurations with a point in focus (i.e., lying in the focal plane 18), a point in front of the focal plane, and a point behind the focal plane, respectively. FIGS. 2(d) through 2(f) illustrate the effect of placing an opaque mask 26 in front of the lens so as to obstruct light entering from one-half of the lens 15. For points in focus as in FIG. 2(d), the overall image intensity 24 is reduced but the image remains stationary. However, as shown in FIGS. 2(e) and 2(f), points in front of the focal plane appear to shift to the right and lose intensity, and points behind the focal plane appear to shift to the left and lose intensity. Thus, except for intensity variations, the image 24 of a point in focus (i.e., lying in the focal plane) is not affected, whereas points in front of the focal plane appear to shift to the right and points behind the focal plane appear to shift to the left. This phenomenon is exploited to great advantage by the present invention.

FIGS. 3(a) and 3(b) depict a discrete version of a range sensor in accordance with the present invention. As shown, two images 24 are obtained by placing the opaque mask 26 on either half of the lens. Note that, although the point source 22 is in the same location, the positions of the images 24 are different in the two figures. This difference is a simple function of the range of the point source 22. The two images of a point lying in the focal plane will be identical whereas the two images of a point in front of or behind the focal plane will be displaced in the image or sensor plane 23 by an amount which can be related to the range of the point source 22 (or point on an object 16). Moreover, points in front of the focal plane will be displaced away from the mask whereas points behind the focal plane will be displaced toward the mask, as shown in FIGS. 2(e) and 2(f). Thus, knowledge of the mask position and the amount of image displacement permits the system to determine information about the range of the object.

Instead of the discrete system of FIGS. 3(a) and 3(b), the present invention preferably employs a differential system that computes the derivative of the image position as a function of aperture position. FIG. 3(c) schematically depicts a presently preferred embodiment of a range sensor in accordance with the present invention. The system of FIG. 3(c) comprises a camera 27 having a pair of plano-convex lenses 28a and 28b, an optical mask 30, an imaging sensor 32, a digitizer 34 and a computer 36. The optical mask 30 may be implemented with a liquid crystal array having spatially varying opacity which can be switched (e.g., by the computer 36) between a differentiable mask function and its derivative. Alternatively, the mask 30 may be composed of two printed masks which are mechanically switched to obtain two images based on the differentiable mask function and its derivative. The imaging sensor 32 may be implemented with a CCD array. To construct a real-time range sensor (i.e., generating about 15 to 30 frames/second), a rapidly switching liquid crystal display could be used to flip between the two aperture masks along with any of a number of standard CCD cameras and lenses.

It can be shown (see E. Adelson and J. Wang, "Single Lens Stereo with a Plenoptic Camera," IEEE Transactions on Pattern Analysis and Machine Intelligence, 14(2) :99–106, 1992; and B. Lucas and T. Kanade, "An Iterative Image Registration Technique with an Application to Stereo Vision," Image Understanding Workshop, pages 121–130, 1981) that the disparity, the difference between the position of a point in two images, is given by:

$$d = \frac{\Sigma_p I_x(x,y) I_v(x,y)}{\Sigma_p I_x^2(x,y)} \quad (1)$$

where, $I_x$ is the partial, spatial derivative (in x) and $I_v$ is the derivative with respect to viewing position along the aperture in the same parameter as the spatial derivative. The former ($I_x$) can be determined using any of a number of standard digital derivative filters (E. Simoncelli, "Design of Multi-Dimensional Derivative Filters," First International Conference on Image Processing, 1994). The latter ($I_v$) is generally not as easy to compute. Nonetheless, a simple, differential method for computing $I_v$ from two images has been developed.

As mentioned, in one presently preferred embodiment of the invention the first image is obtained with a first aperture mask and the second image is obtained by a second mask based on the derivative of the first mask. The spatial derivative, $I_x$, is determined from the first image and the derivative with respect to viewing position, $I_v$, is, by definition, the second image.

According to the present invention, the aperture masks can be based on any differentiable function. One example of a simple mask is based on a two-dimensional Gaussian function given by:

$$G(x,y) = e^{-\frac{(x^2+y^2)}{2\sigma^2}} \quad (2)$$

with a partial derivative in x:

$$G_x(x,y) = -\frac{x}{\sigma^2} e^{-\frac{(x^2+y^2)}{2\sigma^2}} \quad (3)$$

Figures 4A, 4B:
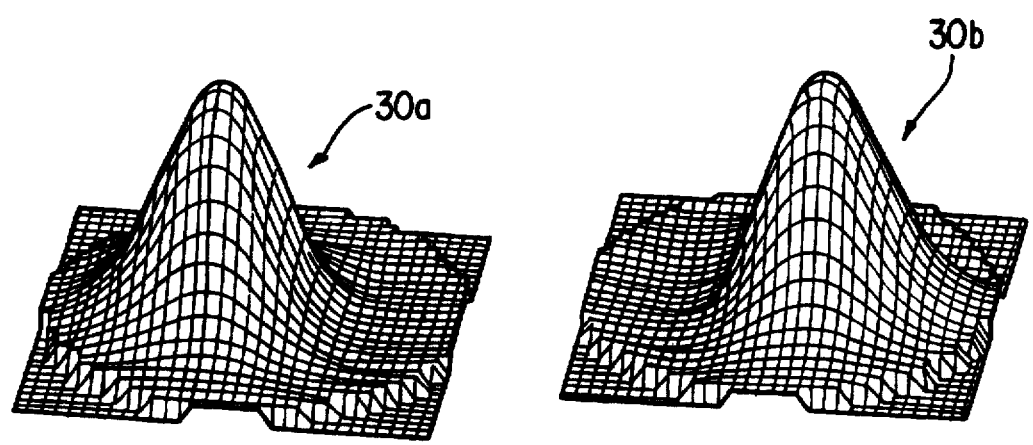
FIGS. 4(a) and 4(b) are plots of the opacity of a pair of optical masks based on a two-dimensional Gaussian $G(x,y)$ and its derivative $G_x(x,y)$. The masks used in a presently preferred embodiment of the invention and depicted in FIGS. 4(a) and 4(b) are linear combinations ($M_0(x,y)$, $M_\pi(x,y)$, see equations 4 and 5) selected to eliminate negative values of opacity.

The desired images, $I_x$ and $I_v$, can be determined from the images taken with the masks in equations 2 and 3. However, $G_x(x,y)$ (equation 3) has negative values, which are impossible to represent in a printed mask since the optical opacity of any part of the mask cannot be negative. Moreover, one cannot simply add a positive constant to $G_x(x,y)$ because the required derivative information would be lost. One can, however, add the necessary amount of $G(x,y)$ to make $G_x(x,y)$ positive. The true image that would have been obtained by imaging with the $G_x(x,y)$ mask can then be recovered by subtracting the image obtained with the $G(x,y)$ mask. The new mask, $M_0(x,y)$, plotted in FIG. 4(a) (ref. no. 30a), is given by:

$$M_0 = (\alpha G(x,y) + \beta G_x(x,y))  \quad (4)$$

where $\alpha$ and $\beta$ are scaling constants. Define $M_\pi(x,y)$, plotted in FIG. 4(b) (ref. no. 30b), to be $M_0(x,y)$ rotated by $\pi$:

$$M_\pi = (\alpha G(x,y) - \beta G_x(x,y))  \quad (5)$$

and it is apparent that with masks $M_0$ and $M_\pi$ the images that would have been obtained with masks $G(x, y)$ and $G_x(x,y)$ can be recovered. Define $I_0(x,y)$ to be the image obtained through mask $M_0$ and define $I_\pi(x,y)$ to be the image obtained through mask $M_\pi$, then the desired images $I(x,y)$ and $I_v(x,y)$, imaged through $G(x, y)$ and $G_x(x, y)$, respectively, are given by:

$$I(x,y) = \frac{I_0(x,y) + I_\pi(x,y)}{2\alpha}  \quad (6)$$

$$I_v(x,y) = \frac{I_0(x,y) - I_\pi(x,y)}{2\beta}  \quad (7)$$

Masks $M_0$ and $M_\pi$ based on Gaussian functions with $\sigma=38.87$, $\alpha=0.7072$ and $\beta=14.5423$ (see equations 4 and 5) were prepared by printing gray scale images with a laser printer onto a clear transparent film. Some experimentation would be required to calibrate the printer to obtain the correct masks. As mentioned, an advantage of using the masks defined by equations 4 and 5 is that the second mask ($M_\pi$) is simply a flipped version of the first mask ($M_0$), and so only one mask need actually be made. The masks were inserted between the pair of half-lenses 28a, 28b to obtain images ($I_0(x,y)$ and $I_\pi(x,y)$) of a step edge placed in front of the lens/mask assembly. The spatial derivative image and derivative with respect to viewing position image ($I_x(x,y)$ and $I_v(x,y)$, respectively) were obtained with equations 6 and 7, and a disparity map was calculated with equation 1. As in most range sensors, since there is no spatial information in most of the image, the only disparity information obtained was for regions near the step edge.

Figure 4C:
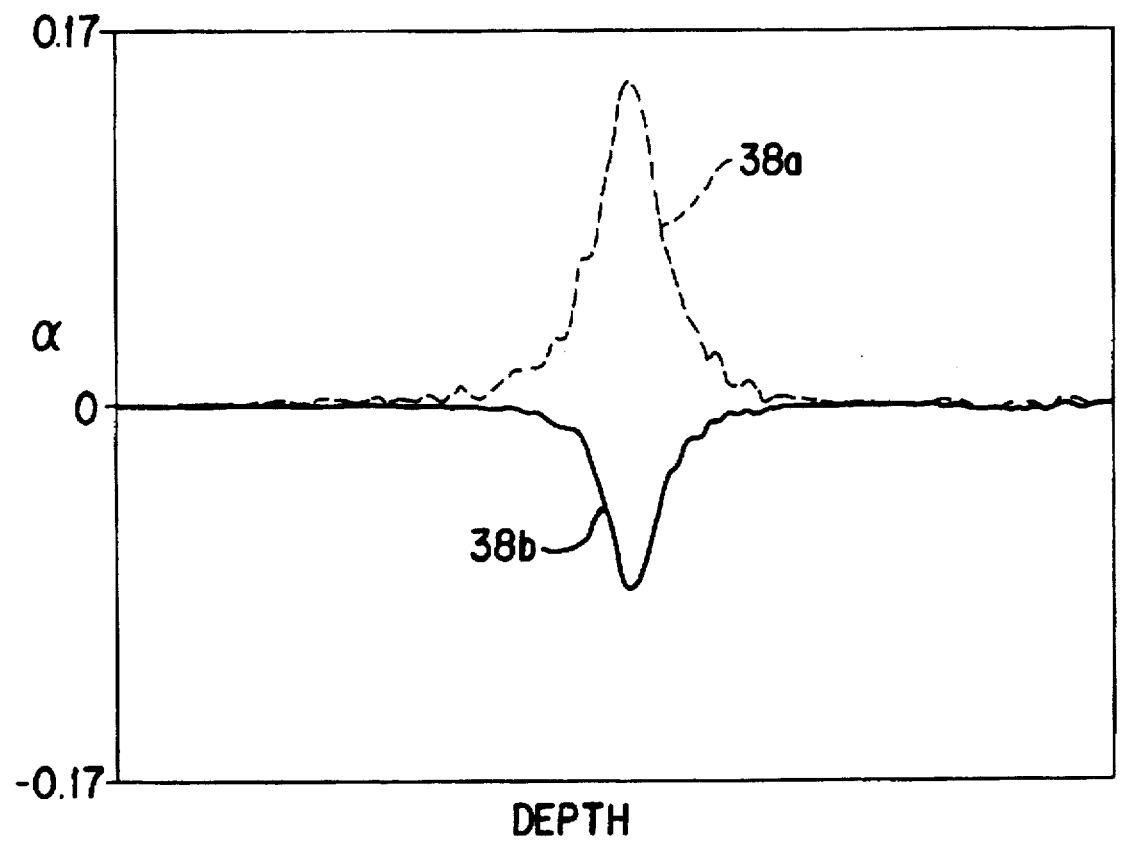
FIG. 4(c) depicts one-dimensional slices from an intermediate image ($\alpha$) determined by the system depicted in FIG. 3(c).

FIG. 4(c) depicts one-dimensional slices 38a and 38b from an intermediate image ($\alpha$) for the step image placed at different distances from the lens assembly at 10 cm displacements. Note that the image changes as a function of the depth.

Figure 5:
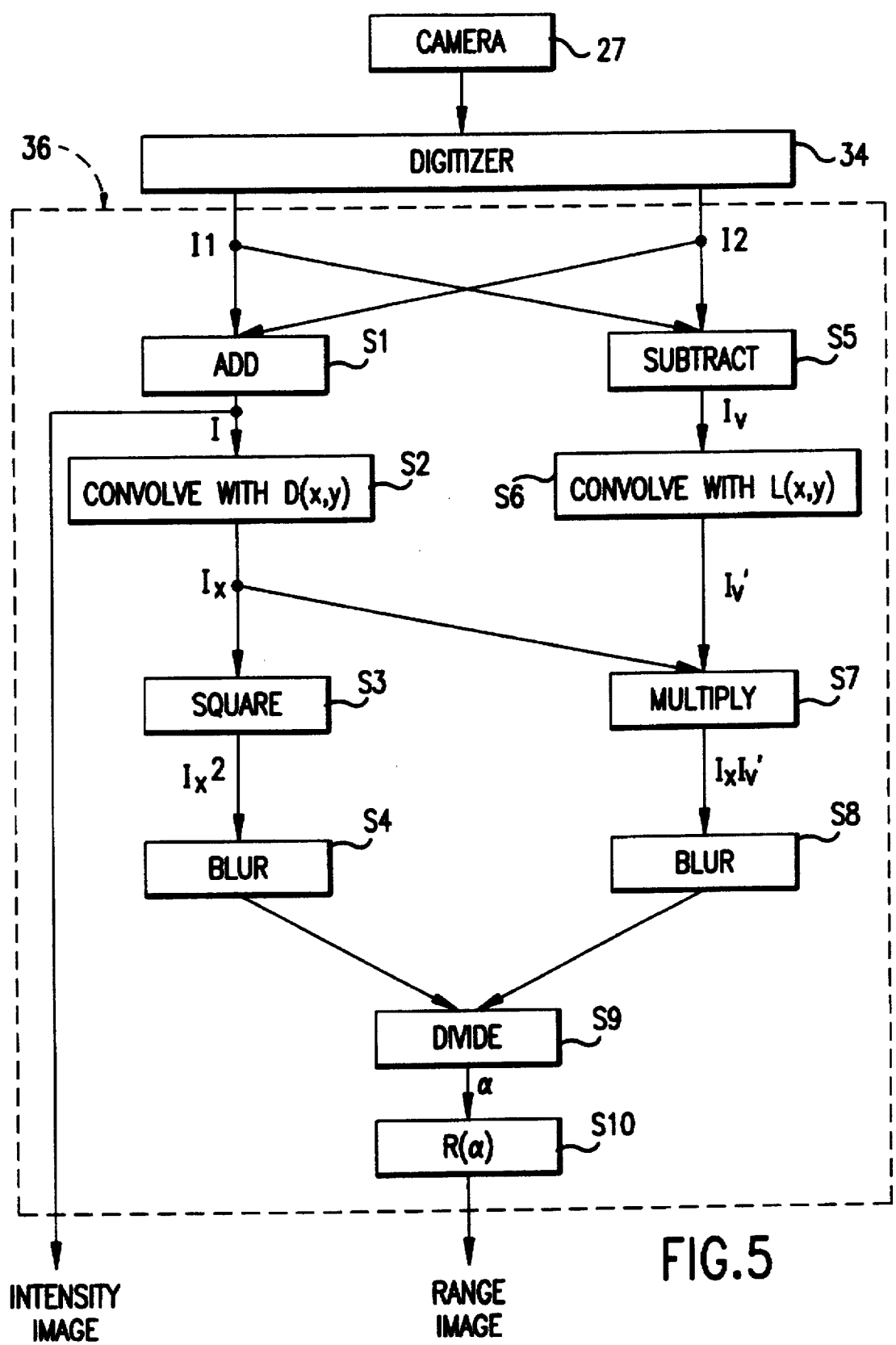
FIG. 5 is a flowchart of a method for determining a range map in accordance with the present invention.

FIG. 5 is a flowchart of a method for determining a range map in accordance with the present invention. The camera 27 and digitizer 34 are employed as described above to provide digital images I1 and I2, obtained with optical masks $M_0$ and $M_\pi$, respectively, to the computer 36 (enclosed in dash lines). The steps S1 through S10 represent the functions performed by software in the computer 36. At step S1, the sum I=I1+I2 (where I is the resultant intensity image) is computed. At step S2, the derivative image $I_x$ is computed. At step S3, $I_x^2$ is computed, and at step S4 the blur image based on $I_x^2$ is computed. At step S5, the difference $I_v$=I1−I2 is computed. At step S6, the blur image $I_v'$ is computed. At step S7, the product $I_xI_v'$ is computed, and at step S8 the blur image based on $I_xI_v'$ is computed. At step S9, an intermediate image $\alpha$ is computed. At step S10, the range image is computed from $\alpha$ using a simple function $R(\alpha)$. In general, this calculation is performed by using the equation $$R(\alpha) = d/\alpha,$$

where d is the distance between the lens and the sensor.

The calculations in steps S2 and S6 involve a convolution. In step S6, the image $I_v$ is convolved with a digital convolution filter $L(x,y)$, which is typically a lowpass filter. In step S2, the image I is convolved with a digital convolution filter $D(x,y)$, which is the derivative of filter $L(x,y)$. This sort of calculation is described in the paper "Design of Multi-Dimensional Derivative Filters," fully cited above.

In sum, the present invention employs a differentiable mask function and its derivative, in combination with a single lens and computer system, to determine range information. Although exemplary embodiments are disclosed herein by way of illustration, the scope of protection of the following claims is not intended to be limited to the specific embodiments described above.

We claim:

1. A single lens range sensor for determining range information, comprising:

(a) a lens;

(b) an optical sensor constructed and arranged to sense optical energy travelling from a visual scene through said lens;

(c) at least one optical mask for alternately providing first and second mask functions for masking said sensor to prevent a portion of said optical energy from reaching said sensor, said mask functions being based on at least a differentiable function and a derivative of said differentiable function; and (d) range determination means for forming an aperture derivative image of an object in said visual scene, and for determining the range of said object on the basis of at least said aperture derivative image.

2. A single lens range sensor as recited in claim 1, wherein said range sensor comprises a CCD array.

3. A single lens range sensor as recited in claim 1, wherein said optical mask comprises a liquid crystal array having spatially varying opacity which is switchable between said differentiable mask function and its derivative.

4. A single lens range sensor as recited in claim 1, wherein said optical mask comprises two printed masks which are mechanically switchable to provide said differentiable mask function and its derivative.

5. A single lens range sensor as recited in claim 1, wherein said optical mask comprises two printed masks, wherein said masks have an opacity represented by the equations:

$$M_0 = (\alpha G(x,y) + \beta G_x(x,y))$$

$$M_\pi = (\alpha G(x,y) - \beta G_x(x,y))$$

where $\alpha$ and $\beta$ are scaling constants, $G(x,y)$ is a differentiable function and $G_x(x,y)$ is the derivative of $G(x,y)$.

6. A single lens range sensor as recited in claim 1, where said optical mask is composed of a single printed mask defined by the equation $$M_0 = (\alpha G(x,y) + \beta G_x(x,y))$$

which can be flipped or rotated to form a mask defined by the equation $$M_\pi = (\alpha G(x,y) - \beta G_x(x,y)).$$

7. A single lens range sensor as recited in claim 1, wherein said lens comprises two plano-convex lenses and said mask is disposed between said two lenses.

8. A method for determining the range of a point or patch in an image, said range being indicative of the distance between said point or patch and a second, known location, comprising the steps of obtaining a spatial derivative image using a first mask and obtaining an aperture derivative image using a second mask, and then combining the spatial derivative and aperture derivative images to obtain information indicative of said range.

9. A method for determining a range map of an image comprising the steps of:

(a) obtaining first and second intensity images (I1 and I2) with first and second optical masks ($M_0$ and $M_\pi$), respectively;

(b) obtaining a sum image (I) by computing a sum of said first and second intensity images, and obtaining a difference image ($I_y$) by computing a difference between said first and second intensity images;

(c) computing a first derivative image ($I_x$) by convolving said sum image with a first convolution filter (D(x,y)), and computing a second derivative image ($I_y'$) by convolving said difference image with a second convolution filter (L(x,y));

(d) computing squared values ($I_x^2$) based on said first derivative image and computing product values ($I_xI_y'$) based on said first derivative image and said second derivative image;

(e) computing a first blur image based on $I_x^2$ and computing a second blur image based on $I_xI_y'$; and (f) computing the range map by dividing $I_xI_y'$ by $I_x^2$.

10. A method for determining a range map of an image as recited in claim 9, wherein said first and second optical masks $M_0$ and $M_\pi$ are characterized by the equations:

$$M_0 = (\alpha G(x,y) + \beta G_x(x,y))$$

$$M_\pi = (\alpha G(x,y) - \beta G_x(x,y))$$

where $\alpha$ and $\beta$ are scaling constants, G(x,y) is a differentiable function and $G_x$(x,y) is the derivative of G(x,y).

* * * * *